Feb. 17, 1925.
O. POWELL
AUTOMOBILE BUMPER
Filed Aug. 12, 1924
1,526,869
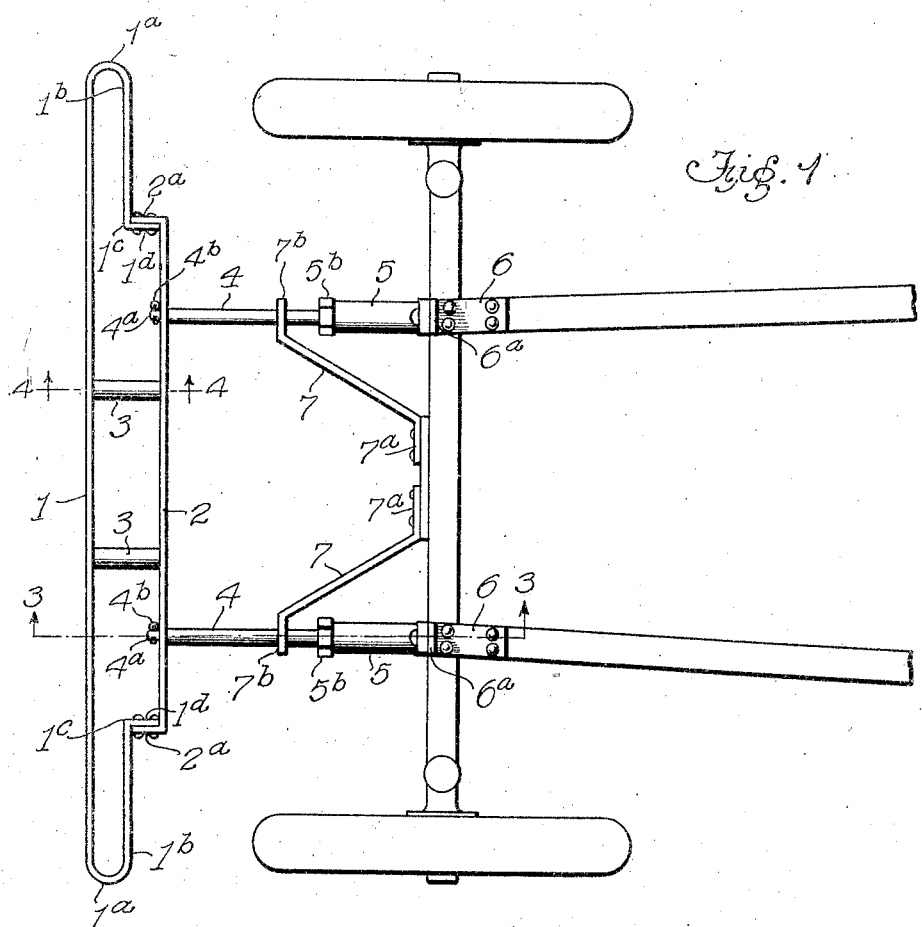
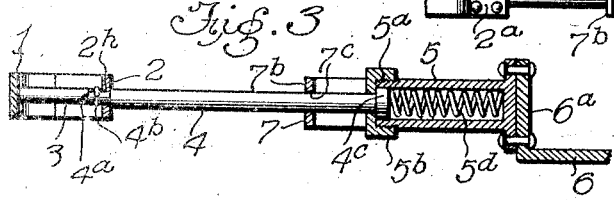
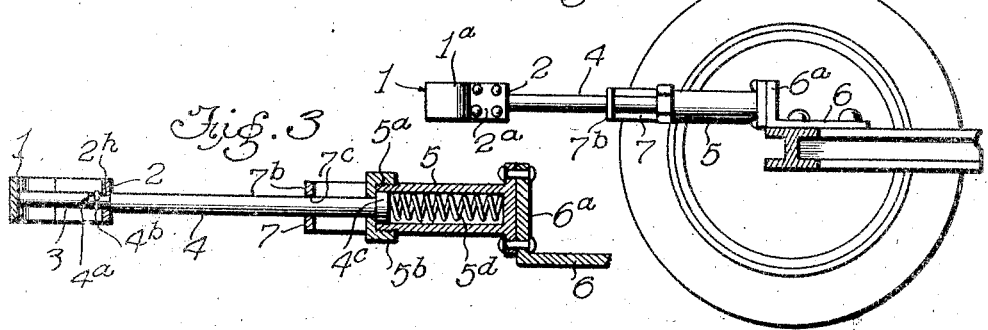
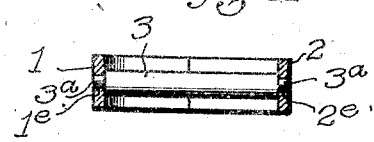

Patented Feb. 17, 1925.

1,526,869.

UNITED STATES PATENT OFFICE.

OLIVER POWELL, OF SCRANTON, PENNSYLVANIA.

AUTOMOBILE BUMPER.

Application filed August 12, 1924. Serial No. 731,593.

*To all whom it may concern:*

Be it known that I, OLIVER POWELL, a citizen of the United States, residing at Scranton, in the county of Lackawanna and State of Pennsylvania, have invented certain new and useful Improvements in Automobile Bumpers; and I hereby declare that the following is a full, clear, and exact description thereof, reference being had to the accompanying drawings, which form part of this specification.

This invention is a novel improvement in bumpers for motor vehicles and the like, and the principal object thereof is to provide a novel bumper which will be simple in construction, can be readily applied to the front, or rear ends, or to both ends, of the vehicle, and will be efficient, sturdy, and durable, said bumper embodying certain novel features of construction as hereinafter set forth.

I will explain the invention with reference to the accompanying drawings, which illustrate one practical embodiment thereof, to enable others to adopt and use the same, and will summarize in the claims the novel features of construction and novel combinations of parts, for which protection is desired.

In said drawings:

Fig. 1 is a top plan view showing my novel bumper applied to the front end of a motor vehicle.

Fig. 2 is a side elevation thereof.

Fig. 3 is an enlarged longitudinal section on the line 3—3, Fig. 1.

Fig. 4 is a section on the line 4—4, Fig. 1.

As shown in the drawings, the bumper bar preferably comprises a front member 1, preferably a strip of flat iron, of any desired width and thickness, said member 1 being adapted to extend across the entire front, or rear, end of the car. The ends $1^b$ of member 1 are preferably bent, as at $1^a$, on a relatively small radius through an arc of 180° so that the bent back portions $1^b$ extend parallel with the main portion of member 1, and are disposed to the rear thereof, in order to give proper resiliency to the member 1. The free ends $1^c$ of portions $1^b$ are further flanged rearwardly, as the $1^d$ parallel with the longitudinal axis of the vehicle and equidistant therefrom, said flanges $1^d$ being cut to the same length, as shown in Fig. 1.

The second member 2, of the bumper bar preferably extends parallel with the member 1, and has its outer ends $2^a$ flanged forwardly, as shown, to overlie the flanges $1^d$ of member 1, and the flanges $1^d$, $2^a$, may then be fastened together by any desired means, such as by bolts or rivets as shown.

In order to further enhance the staunchness and rigidity of the bumper bar, I place a plurality of spacing members 3 as shown in Figs. 1, 3 and 4, between the members 1 and 2, said spacing members being disposed parallel with the axis of the vehicle. Members 3 (two being shown) preferably comprise metallic rods of length equal to the overall distance between members 1 and 2, said rods 3 being of relatively large diameter and having their ends reduced as at $3^a$ and adapted to engage perforations $1^e$, $2^e$, in the members 1 and 2 respectively. Hence, the members 3 will transmit part of the strain on member 1, when stressed, to member 2, thereby increasing the rigidity of the bumper bar.

The bumper bar member 2 is supported from the frame of the vehicle, either at the front or rear thereof or both, by means of two substantial rod members 4, which rods 4 are equally spaced on opposite sides of the longitudinal axis of the vehicle, and have their outer ends reduced as at $4^a$ to engage perforations $2^b$ in the member 2, and member 2 may be retained upon the outer ends of rods 4 by any desired means, such as by means of cotter pins $4^b$ transfixing the reduced ends $4^a$ of said rods.

The opposite ends of rods 4 are provided with piston heads $4^c$, as shown in Fig. 3, and are adapted to fit within the walls of cylinders 5, which cylinders are horizontally mounted upon the frame of the vehicle, as hereinafter described.

Cylinders 5, are open at their front ends, but closed at their rear ends, the front ends thereof being threaded, as at $5^a$, to receive perforated nuts $5^b$ through which the rods 4 extend, the nuts preventing the piston heads $4^c$ from becoming disengaged from the cylinders 5, and the perforations therein acting as supports for the rods 4. Between the piston heads $4^c$ and the inner ends of cylinders 5, are placed coil springs $5^d$, as shown to normally press the rods 4 outwardly, and to absorb any shocks imposed upon the bumper bar.

The cylinders 5 may be attached to the frame of the vehicle in any desired manner, As shown, they are bolted to the up-turned ends 6ª of bars 6, which bars are bolted or riveted to the frame of the vehicle.

In order to further support and brace the rods 4, especially against lateral thrusts, I provide angularly disposed braces 7 having flanges 7ª on their inner ends bolted or otherwise secured to the frame of the vehicle, intermediate the cylinders 5, the outer ends of said braces 7 being flanged as at 7ᵇ, in opposite directions to flanges 7ª, and having perforations 7ᶜ therein for the passage therethrough of the rods 4, said braces 7 further supporting the outer ends of rods 4 to maintain the latter in correct horizontal alignment, and preventing lateral deflection thereof.

My novel bumper provides a novel reinforced bumper bar, which may readily and yieldingly be mounted on the frame of a vehicle, and is further provided with angularly disposed braces to support and prevent lateral deflection of the rods 4; furthermore my novel bumper may be readily mounted upon any type of vehicle, and at either or both ends thereof.

I do not consider my invention restricted to the exact form shown in the drawing, for obviously the bumper may be somewhat modified without departing from the scope of the invention.

I claim:

1. A bumper for vehicles comprising rods yieldingly mounted upon and extending beyond the frame of said vehicle; a bumper bar supported on the outer ends of said rods; and angularly disposed brace bars each having one end attached to the vehicle frame and the other end perforated to slidably engage its related rod.

2. A bumper for vehicles comprising rods yieldingly mounted upon and extending beyond the frame of said vehicle; a bumper bar supported on the outer ends of said rods; angularly disposed brace bars each having one end attached to the frame and the other end perforated to slidably engage its related rod; said bumper bar comprising parallel members connected together at their outer ends; and a plurality of spacing members interposed between said parallel members, whereby the strain on the outer parallel member, when stressed, will be transmitted to the other parallel member.

3. A bumper for vehicles comprising a plurality of parallel rods yieldingly mounted upon and extending beyond the frame of said vehicle; a bumper bar detachably mounted upon the outer ends of said rods; and angularly disposed brace bars for said rods each having one end attached to the vehicle frame, the other end being perforated to slidably engage the outer end of its related rod.

4. A bumper for vehicles comprising a plurality of parallel rods yieldingly mounted upon and extending beyond the frame of said vehicle; a bumper bar detachably mounted upon the outer ends of said rods; angularly disposed brace bars for said rods, each having one end attached to the vehicle frame, the other end being perforated to slidably engage the outer end of its related rod; said bumper bar comprising a plurality of parallel members connected together at their ends; and a plurality of spacing members interposed between said parallel members, whereby the strain on the bar, when stressed, will be transmitted to all the parallel members.

5. A bumper for vehicles comprising a pair of cylinders mounted on and extending from the vehicle frame; piston rods mounted in said cylinders; springs in said cylinders adapted to normally extend said rods outwardly; a bumper bar mounted on said rods; and opposed angularly disposed braces each having one end attached to the vehicle frame, and the other end perforated for the passage therethrough of its related piston rod.

6. A bumper for vehicles comprising a pair of cylinders mounted on and extending from the vehicle frame; piston rods mounted in said cylinders; springs in said cylinders adapted to normally extend said rods outwardly; a bumper bar mounted on said rods; opposed angularly disposed braces each having one end attached to the vehicle frame, and the other end perforated for the passage therethrough of its related piston rod; said bumper bar comprising a plurality of parallel members; means for connecting the outer ends of said members together; and spacing members interposed between said parallel members, whereby the strain on the outer parallel member, when stressed, will be transmitted to the other parallel members.

7. A bumper for vehicles comprising a pair of cylinders mounted on and extending from the vehicle frame; piston rods mounted in said cylinders; springs in said cylinders adapted to normally extend said rods outwardly; nuts on the outer ends of said cylinders having perforations therein for the passage therethrough of said piston rods; a bumper bar mounted on the outer ends of said rods; and opposed angularly disposed braces each having one end attached to the vehicle frame, and the other end perforated for the passage therethrough of its related piston rod, to maintain said rod in alignment with its cylinder.

8. In a bumper as set forth in claim 7, a bumper bar comprising a member extending transversely of said vehicle and having its outer ends bent inwardly and flanged rearwardly; a second member parallel with said first member and having its outer ends flanged forwardly to overlie the flanges of said first member; means for connecting the said flanges together; and a plurality of spacing members interposed between said members, whereby the strain on the first member, when stressed, will be transmitted to the other member.

9. A bumper for vehicles comprising a pair of cylinders mounted on and extending from the vehicle frame; piston rods mounted in said cylinders; springs in said cylinders adapted to normally extend said rods outwardly; nuts on the outer ends of said cylinders having perforations therein for the passage therethrough of said piston rods; a bumper bar mounted on the outer ends of said rods; opposed angularly disposed braces each having one end attached to the vehicle frame, and the other end perforated for the passage therethrough of its related piston rod; said bumper bar comprising a member extending transversely of said vehicle and having its outer ends bent inwardly and flanged rearwardly; a second member parallel with said first member and having its outer ends flanged forwardly to overlie the flanges of said first member; means for connecting the said flanges together; and a plurality of spacing members interposed between said members, whereby the strain on the first member, when stressed, will be transmitted to the other member.

In testimony that I claim the foregoing as my own I affix my signature.

OLIVER POWELL.